United States Patent
Groll

(10) Patent No.: US 7,820,304 B2
(45) Date of Patent: Oct. 26, 2010

(54) CORROSION/ABRASION-RESISTANT COMPOSITE COOKWARE

(75) Inventor: William A. Groll, McMurray, PA (US)

(73) Assignee: All-Clad Metalcrafters LLC, Canonsburg, PA (US)

( * ) Notice: Subject to any disclaimer, the term of this patent is extended or adjusted under 35 U.S.C. 154(b) by 0 days.

(21) Appl. No.: 12/356,625

(22) Filed: Jan. 21, 2009

(65) Prior Publication Data

US 2009/0186241 A1   Jul. 23, 2009

Related U.S. Application Data

(60) Provisional application No. 61/022,530, filed on Jan. 22, 2008.

(51) Int. Cl.
*B32B 15/20* (2006.01)
*B32B 1/02* (2006.01)

(52) U.S. Cl. ........................ 428/653; 428/654
(58) Field of Classification Search ........................ None
See application file for complete search history.

(56) References Cited

U.S. PATENT DOCUMENTS

| | | | | |
|---|---|---|---|---|
| 3,340,597 A | * | 9/1967 | Stein et al. | 228/206 |
| 3,400,450 A | * | 9/1968 | Nock, Jr. et al. | 228/190 |
| 3,440,712 A | * | 4/1969 | Stroup et al. | 228/221 |
| 3,496,620 A | * | 2/1970 | Wolfe, Jr. | 428/654 |
| 3,577,920 A | * | 5/1971 | London et al. | 101/459 |
| 3,798,010 A | * | 3/1974 | Sharp et al. | 428/612 |
| 3,798,011 A | | 3/1974 | Sharp, Jr. | |
| 4,477,011 A | * | 10/1984 | Austin | 228/173.2 |
| 5,952,112 A | * | 9/1999 | Spring | 428/653 |
| 6,067,831 A | * | 5/2000 | Amborn et al. | 72/58 |
| 6,224,992 B1 | * | 5/2001 | Delbeke et al. | 428/654 |
| 6,807,836 B2 | * | 10/2004 | Sambuco et al. | 72/236 |
| 2002/0142185 A1 | | 10/2002 | Kilmer | |
| 2004/0058188 A1 | | 3/2004 | Groll | |
| 2004/0229079 A1 | * | 11/2004 | Groll | 428/653 |
| 2005/0271894 A1 | * | 12/2005 | Groll | 428/650 |

FOREIGN PATENT DOCUMENTS

| | | | |
|---|---|---|---|
| JP | 63-3197 | * | 1/1988 |
| JP | 63-280626 | * | 11/1988 |
| JP | 6-228690 | * | 8/1994 |
| JP | 6-228691 | * | 8/1994 |
| JP | 8-3671 | * | 1/1996 |

OTHER PUBLICATIONS

ENDUR-AL, Alcoa brochure on alloy 5456 in H34 temper, no date.*
Materials Data Handbook, Aluminum Alloy 5456, NASA, Jun. 1972, pp. 1-93.*

* cited by examiner

*Primary Examiner*—John J Zimmerman

(57) ABSTRACT

A composite metal sheet (20) comprising a core layer (24) of drawable aluminum alloy such as 3003 or 3004 aluminum alloy roll bonded to a thinner layer (26) of 5456 aluminum alloy, the composite metal sheet including a layer (22) of stainless steel roll bonded to the layer of drawable aluminum (24) on the opposite side from the 5456 aluminum alloy layer (26). The composite metal sheet is useful in forming drawn cookware (2) such as fry pans, stock pots, and the like wherein the stainless steel layer (22) forms the cooking surface and the 5456 aluminum alloy layer (26) forms the exterior surface of the cookware.

11 Claims, 1 Drawing Sheet

CORROSION/ABRASION-RESISTANT COMPOSITE COOKWARE

CROSS-REFERENCE TO RELATED APPLICATION

This application claims the benefit of U.S. Provisional Patent Application No. 61/022,530 filed Jan. 22, 2008, which is incorporated by reference herein in its entirety.

BACKGROUND OF THE INVENTION

For many well-known reasons, aluminum is a good metal to include in cookware. It has good conductivity, lightweight, high latent energy and most alloys of aluminum can be readily formed into useful cookware shapes. Yet, most aluminum alloys are highly reactive and will react with cleaning detergents or food so the interior of cookware is often coated with a synthetic coating or bonded to stainless steel to provide an acceptable food preparation surface. The exterior is seldom left bare because of the soft and reactive nature of aluminum metal. Numerous paints and polymers and anodizing have been applied to protect aluminum while withstanding the rigors of wear and heat. Certain alloys of aluminum which contain high contents of other metals such as magnesium are much more resistant to chemical attack and mechanical wear but lack the ductility to be formed into useful shapes for cookware.

SUMMARY OF THE INVENTION

For the above reasons, I propose the creation of an "Al-clad" type of a two or three layer composite with a 5% to 10% of the thickness of the cladding of an aluminum alloy such as type 5456 aluminum alloy to at least one side of a two layer aluminum composite strip. The majority of the thickness of the Al-clad composite would be an aluminum alloy with much better deep draw characteristics such as type 3003 or 3004 aluminum alloy. This concept also includes an Al-clad made with 5% to 10% cladding thickness of a highly chemical attack-resistant alloy such as 5456 alloy, a core layer of a deep draw aluminum alloy such as type 3003 or 3004 and a cladding layer of higher purity (90% or greater) aluminum such as type 1145 or 1100 alloy or EC grade. The presence of the 1100 aluminum alloy would allow the bonding of a stainless steel layer to one side of the Al-clad composite where the stainless steel layer defines the cook surface of the cookware. This creates a composite that has the following characteristics:

Deep draw capability due to the ductile properties of the core aluminum layer and the stainless steel;

A stainless surface to be used as the food preparation surface on the interior of cookware;

An exterior surface of the 5456 aluminum alloy which is more mechanically durable than pure aluminum or deep draw alloys and will resist the acidic, caustic or salt attack of foods and dishwasher cleaning agents.

A product such as the one described would offer the following advantages:

The exterior of the cookware defined by the 5456 aluminum alloy could be finished as a buffed or brushed texture and serve as a final product finish without the presence of expensive coating procedures which can wear through or break down with use;

The creation of the Al-clad core is no more expensive than the existing one side or two side Al-clads on the market currently.

Therefore, this process offers a higher level of exterior surface protection with a better production cost.

The surface hardness of an alloy such as 5456 aluminum alloy is much higher than that of pure aluminum or deep draw 3003 or 3004 alloy. Therefore, the cookware article will resist mechanical wear and will have a longer useful life. The brushed surface will not easily be abraded during use or chemically attacked by dishwasher cleaning products which are caustic and known to attack other aluminum alloys commonly used for cookware.

DETAILED DESCRIPTION OF THE INVENTION

Figure 1:
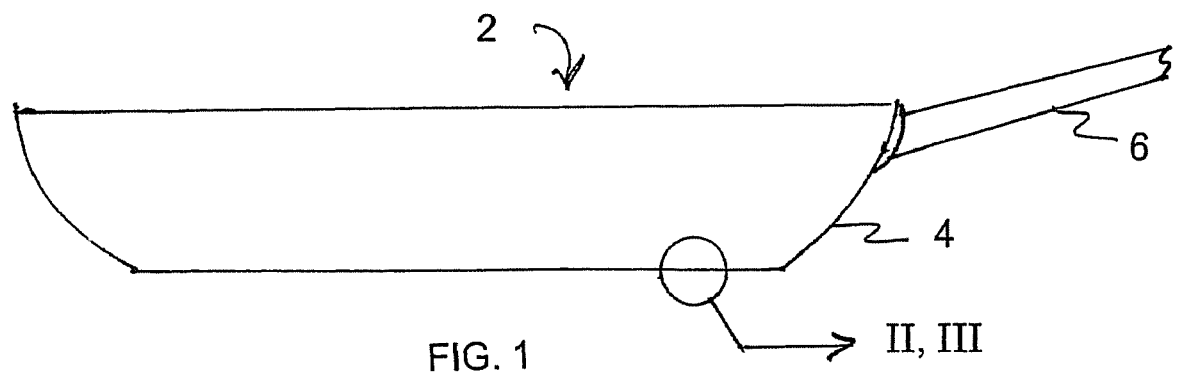
FIG. 1 is a side elevation view of a frypan of the present invention.

FIG. 1 shows a typical piece of cookware 2 of the invention in the form of a drawn frypan 4 having a handle 6 attached thereto.

Figure 2:
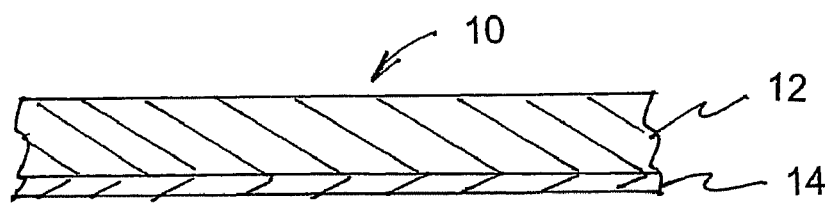
FIG. 2 is an enlarged cross-sectional view of the composite metal layer of the present invention taken at circle II of FIG. 1.

FIG. 2 depicts one presently preferred embodiment of a two-layer roll bonded composite metal sheet 10 of the present invention which forms the cookware pan or pot 2. The composite metal layer 10 is made from a layer 12 of a drawable aluminum alloy such as a type 3003 or 3004 alloy roll bonded to a thinner layer 14 of 5456 aluminum alloy which forms the exterior of the cookware. After drawing the composite metal layer 10 to a desired cookware shape such as a pot or pan, the exterior surface of the 5456 alloy is preferably brushed to provide a cosmetically pleasing surface finish which will resist abrasive wear and scratching due to the high hardness of the 5456 aluminum alloy.

Figure 3:
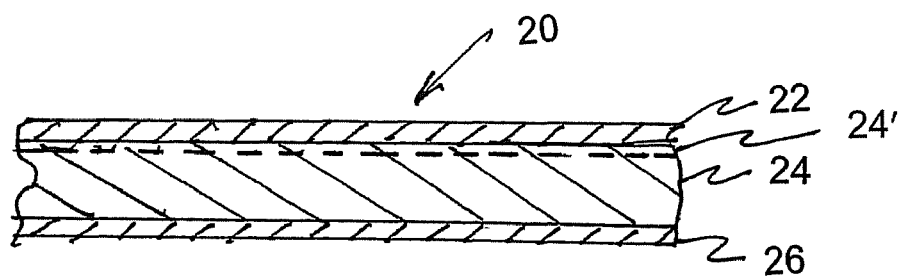
FIG. 3 is an enlarged cross-sectional view of a second embodiment of the composite metal layer of the present invention taken at circle III of FIG. 1.

FIG. 3 depicts a further embodiment of the present invention in the form of a three-layer composite metal sheet 20. The composite metal sheet 20 is formed by roll bonding a core layer 24 of a drawable aluminum alloy such as a 3003 or 3004 aluminum alloy to thin outer layers of stainless steel 22 (preferably an austenitic 304 grade or the like) and a 5456 aluminum alloy layer 26. In this embodiment, the stainless steel layer 22 defines the inner cook surface of the cookware 2 and the 5456 aluminum alloy layer 26 defines the exterior surface of the cookware. The core layer 24 of 3003 or 3004 aluminum alloy provides strength and enhanced thermal conductivity during cooking while also providing good deep drawing properties during the cookware forming operation. The embodiment of FIG. 3 is particularly resistant to harsh dishwasher detergents which have corrosive caustic cleaning agents present because both the exposed inside stainless steel layer 22 and the exposed exterior 5456 aluminum alloy layer 26 are resistant to corrosive attack.

The core layer 24 of a drawable aluminum alloy such as 3003 or 3004 aluminum alloy may also include a layer 24' of a pure aluminum such as type 1145 or 1100 aluminum alloy or EC grade, located adjacent the stainless steel layer 22 so as to improve the strength of the bond between the stainless steel and the drawable aluminum core 24.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

What is claimed is:

1. Cookware comprising: a drawn vessel of a multi-layer composite having an interior cooking surface and an exterior surface, wherein the interior cooking surface is selected from one of aluminum alloy or stainless steel and the exterior surface is 5456 aluminum alloy.

2. The cookware according to claim 1, wherein the interior surface is selected from 3003 or 3004 aluminum alloy.

3. The cookware according to claim 1, wherein the vessel is made from a roll bonded composite sheet.

4. The cookware according to claim 1, wherein a layer of the multi-layer composite comprising the exterior surface is thinner than a layer of the multi-layer composite comprising the interior surface.

5. The cookware according to claim 1, wherein the exterior surface has a brushed surface finish.

6. Cookware comprising: a drawn vessel of a multi-layer composite having an interior cooking surface and an exterior surface, wherein the interior cooking surface is stainless steel and the exterior surface is 5456 aluminum alloy and disposed between said interior and exterior surfaces is an intermediate layer including an aluminum alloy.

7. The cookware according to claim 6, wherein the intermediate layer is selected from one of 3003 or 3004 aluminum alloy.

8. The cookware according to claim 6, wherein the vessel is made from a roll-bonded composite sheet and includes a layer of pure aluminum between said stainless steel and said intermediate layer.

9. The cookware according to claim 6, wherein the layer comprising the 5456 aluminum alloy exterior surface is thinner than the intermediate layer.

10. The cookware according to claim 6, wherein the layer comprising the stainless steel interior surface is thinner than the intermediate layer.

11. The cookware according to claim 6, wherein the exterior surface has a brushed-surface finish.

* * * * *